Figure 1:
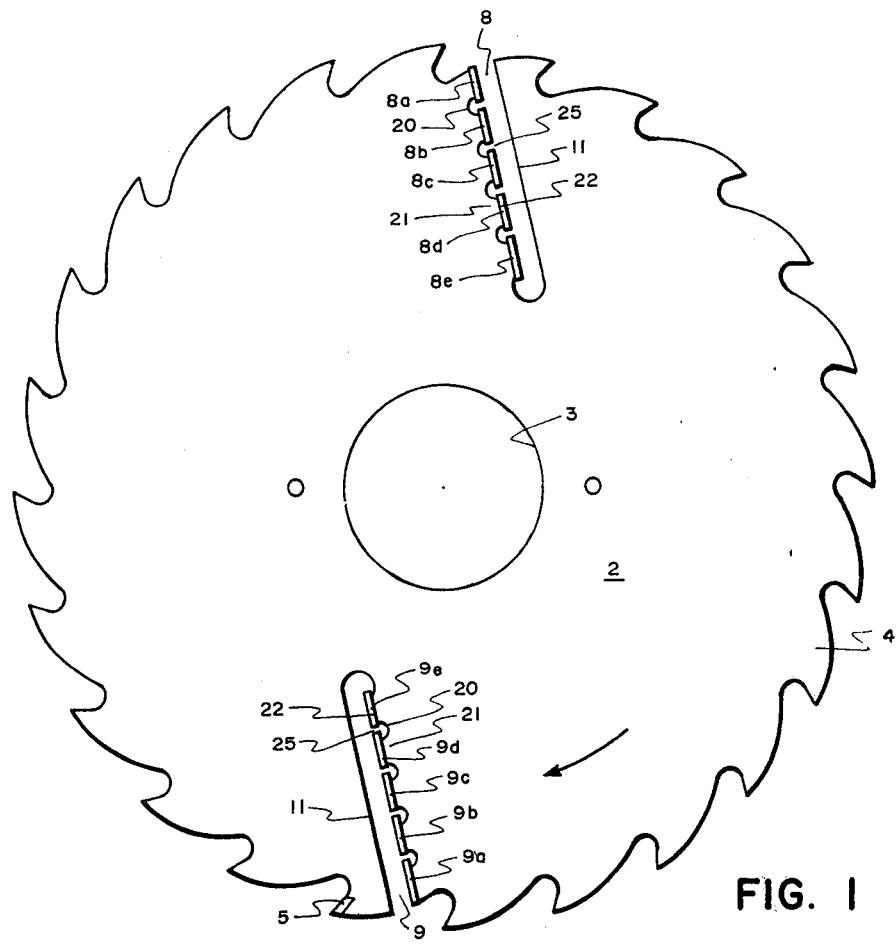

United States Patent [19]

Wright et al.

[11] 4,123,958

[45] Nov. 7, 1978

[54] CIRCULAR SAW BLADE

[75] Inventors: John H. Wright, Nacagdoches, Tex.; George H. Jacobsen, Portland, Oreg.

[73] Assignee: Pacific Saw & Knife Company, Portland, Oreg.

[21] Appl. No.: 841,296

[22] Filed: Oct. 12, 1977

Related U.S. Application Data

[63] Continuation of Ser. No. 680,531, Apr. 26, 1976, abandoned.

[51] Int. Cl.² .................. B23D 45/00; B27B 5/00
[52] U.S. Cl. ........................................ 83/837; 83/835
[58] Field of Search ................ 83/837, 855, 854, 835, 83/676, 661

[56] References Cited

U.S. PATENT DOCUMENTS

| 3,299,917 | 1/1967 | Pearson | 83/837 |
| 3,563,286 | 2/1971 | Strobel et al. | 83/855 |
| 3,700,016 | 10/1972 | Strobel | 83/835 X |
| 3,730,038 | 5/1973 | Farb | 83/835 X |

FOREIGN PATENT DOCUMENTS 2,218,607  10/1973  Fed. Rep. of Germany ............ 83/676

Primary Examiner—Horace M. Culver
Attorney, Agent, or Firm—Klarquist, Sparkman, Campbell, Leigh, Hall & Whinston

[57] ABSTRACT

A circular saw blade having a plurality of spaced teeth around its periphery and having plural slots extending inwardly from the periphery generally toward the center, the slots being spaced on the cutting side with a series of spacing elements individually secured to lands provided by notches or recesses which provide the lands.

3 Claims, 2 Drawing Figures

CIRCULAR SAW BLADE

This is a continuation of application Ser. No. 680,531, filed Apr. 26, 1976 and now abandoned.

BACKGROUND OF THE INVENTION

This invention relates to an improved circular saw blade for longitudinally sawing wood.

We are aware of the prior art patents to Strobel U.S. Pat. Nos. 3,563,286 and 3,700,016, relating to circular saw blades having a pair of exteriorly located, inwardly extending, non-radial slots. Our invention is an improvement on this type of circular saw blade.

The slots in the patented saw blade are intended to relieve stress, to aid in cleaning out the kerf, to attain straighter cutting action and to achieve other beneficial results. The problems which these slots are intended to solve increase with increases in diameter and decreases in thickness of a saw blade.

In each of the above patents, the trailing edge of each slot carries a hard cutting element extending substantially full length of the edge and welded or brazed full length to such edge.

We have noticed that saws having a full length or unitary cutting element per slot tend to have a relatively short life or tend, quite soon, to become damaged during operation. The former situation means frequent saw replacement, while the latter means frequent saw maintenance. We believe that the provision of a full length or unitary cutting element sets up static stresses in the saw blade, and causes dynamic stresses during the operation of the blade, and that these stresses are responsible for the problems just referred to.

Static stresses are set up because the coefficient of thermal expansion of the cutting elements is different from that of the body of the saw blade, so that when the unitary or full length cutting element is welded or brazed in place, stresses are set up in both the cutting element and in the body of the saw blade during cooling of the blade. These remain in the blade so that during operation, fracture of the cutting element and the saw blade more readily occur.

Furthermore, in the step of securing a full length unitary cutting element in place, there is a sufficient build up of heat in order to properly secure the unitary cutting element in place, that there unavoidably occurs an annealing action on the body of the blade, which is undesirable and also prevents the blade from retaining proper tension.

Dynamically, when the saw operates under binding conditions, problems arise because the unitary cutting element is relatively rigid and cannot flex and thus rubs harshly against the sides of the kerf resulting in overheating of the saw blade, causing excessive stresses in the cutting element and blade.

In addition, a saw having a full length or unitary cutting element tends to encounter certain difficulties in operation apart from the ones mentioned above. For instance, such a unitary cutting element has a difficult time breaking up collected dust in a kerf, and is adversely affected by vibration because it cannot adapt sufficiently, and thus soon breaks.

An object of the present invention is to provide a circular saw blade overcoming entirely or at least in a substantial way the above drawbacks.

SUMMARY OF THE INVENTION

We have discovered that the above drawbacks can be substantially reduced or eliminated by (1) forming a series of curved notches or recesses along the trailing edge of a slot to provide a plurality of blunt fingers terminating in lands which are isolated from one another, (2) providing, instead of a full length cutting element, a series of cutting elements, one for each land and disposed in slight spaced relation to one another, (3) welding or brazing these elements in place in an alternating sequence to lessen the application of heat and stress build up, and (4) staggering the elements in one slot relative to those in the other to provide overlap and thus full length effectiveness of the cutting edges relative to the length of the slots.

A saw blade constructed as above recited overcomes to a substantial extent the disadvantages recited above in connection with a saw blade having unitary or whole length cutting elements. First, there are less static stresses because in securing the plural cutting elements in place, there can be adjustment of the position of one cutting element relative to its neighbor or neighbors as determined by the expansion and contraction of the saw blade body in accordance with the heating that occurs. This prevents the build up of static stresses in both the cutting element and the body of the blade, thereby to lessen the likelihood of fracture of the blade when in use, under dynamic stresses. Also, the amount of heat necessary to secure the plural cutting elements in place is better distributed to thus lessen any unwanted annealing action on the body of the saw, thus enabling the body of the saw to retain proper tension. The most important overall advantage is flexibility, both statically and dynamically, statically in the sense above mentioned, and dynamically in that when the saw is in a bind, the blunt fingers allow relative lateral movement of the cutting elements with respect to one another and permit the plural cutting elements to go back to normal after the binding action recedes. Thus, the stresses during cutting in a bind are less and are more effectively distributed over a wider area, thus lessening the dynamic stresses on both the cutting elements and the body of the saw blade. A further advantage of our saw is that when operating in a bind, the slits or gaps between the saw blades tend to break up the collected dust in the kerf and carry it out, which is not the case with an unbroken unitary cutting element.

There is also better dynamic flexibility under vibrating conditions because the individual cutting elements can move relative to one another and adjust to the vibrating forces which a unitary element cannot do. Furthermore, during operation, when stresses are imposed upon the saw blade by virtue of the cutting elements, these stresses are distributed over the curved wall edges of the curved recesses rather than being concentrated in finite areas. Thus, cracks tend not to develop behind the cutting elements, as is the case of unitary or full length cutting elements.

Our saw runs cooler in that in a bind the relative lateral adjustment of the cutting elements with respect to one another result in less lateral pressure against the sides of the kerf so that the saw tends to effectively work its way through the binding condition without creation of excessive heat. Our saw also tends to operate effectively in sawing frozen timber, primarily because of its dynamic flexibility.

Because of the overall flexibility of the saw and the lesser dynamic and static stresses, there is much less maintenance required to keep our saw in operation, than with a saw having the unitary full length cutting elements. Also, if our saw gets bent, it is much easier to work out the bends because the static flexibility of the cutting elements permits them to readily adjust as the straightening operation proceeds.

DRAWINGS

Figure 2:
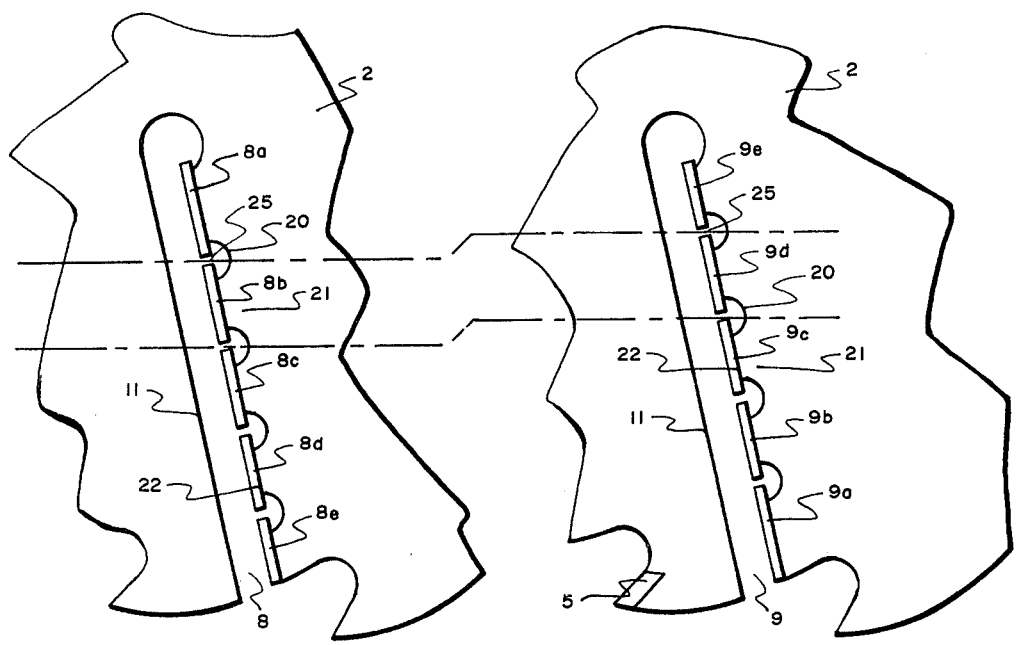

FIG. 1 is a face elevation of a saw blade embodying the present invention;

FIG. 2 comprises a pair of fragmentary views showing the pair of slots of the saw having been disposed side by side to show the staggering of the cutting elements relative to one another.

DESCRIPTION

Referring to FIG. 1, the circular saw blade has a disc like body portion 2 having a central mounting opening 3 and a plurality of saw teeth 4 circumferentially positioned around the periphery of the plate 2. It will be understood that the leading edge of each tooth is faced with a suitable cutting insert, one labeled 5 being shown, it being understood that the other teeth have similar inserts. The width of the inserts is greater than that of the body 2 of the saw and the inserts determine the width of the kerf that is taken when sawing wood.

Between the regular spacing of two of the teeth 4, the body 2 of the circular saw blade is slotted from the periphery inwardly to provide a first slot 8 and a second slot 9. These slots bear an angular relationship to the blade of the same order as in the above mentioned Strobel patents.

Each of the slots has a plain leading edge 11 and a trailing edge equipped with a series of cutting elements. In the particular embodiment of the invention shown there are five cutting elements shown for the trailing edge of each slot, but a greater or lesser number could be used depending upon the size of the blade. The cutting elements for the slot 8 are labeled 8a, 8b, 8c, 8d and 8e, and for the slot 9, 9a through 9e.

The trailing edge of each slot is formed with a series of curved recesses 20 whereby to provide a series of blunt fingers 21. These terminate in lands 22 which are aligned with one another and to which the cutting elements 8a–8e and 9a–9e are welded or brazed. The cutting elements are of such length that they terminate short of one another to provide a series of slits 25.

Preferably, the welding or brazing operations take place as follows: one element on its land in one slot is secured in place, and thereafter one element in the other slot is secured in place, while the metal in the area of the first secured element is cooling, whereafter a second element in the first named slot is secured in place, etc. This alternating sequence lessens the build up of heat and stresses in the metal and lessens the annealing effects.

FIG. 2 shows that the slits of the elements in slot 8 are staggered with relation to the slits in the elements in slot 9. This is accomplished by making the outermost cutting element 9a and the associated land somewhat longer than the cutting element 8a and its associated land. The inner elements 9b through 9e are the same length and shorter than element 9a. Elements 8a through 8d are the same length but shorter than the innermost element 8e.

The staggering of the slits 25 between the cutting elements in slots 8 and 9 achieve a full cutting effect for the entire length of the slots since what is missed by the slits of one slot is picked up by the elements of the following slot.

We have found that preferably the length of the lands should not be much greater than twice the maximum dimension of the stress relieving recesses, and in any event not more than three times the width of such stress relieving recesses if optimum advantages are to be obtained.

What is claimed is:

1. A circular saw blade comprising:
   a generally circular saw plate having a plurality of teeth spaced about the periphery thereof,
   the saw blade being formed with a central opening for mounting purposes,
   at least two slots in the saw plate disposed between the teeth and extending inwardly from the periphery of the saw plate toward the central opening and dividing the saw plate into sectors,
   cutting elements mounted on the leading edges of the teeth, each projecting laterally in both directions beyond the side faces of the saw plate,
   plural cutting elements for the trailing edge of each slot mounted in aligned relation,
   said elements being elongate and having opposed end faces,
   said trailing edges of each slot being formed with a single arcuate recess for and located behind each pair of opposed end faces,
   each pair of opposed end faces being spaced from one another only slightly to provide a gap not greater than the width of the recess,
   said recesses providing lands isolated from one another and to which said cutting elements are secured,
   said recesses serving to distribute stress in the areas between the cutting elements.

2. A saw blade as recited in claim 1 in which the cutting elements in one slot are staggered relative to the cutting elements in the other slot, the outermost element in one slot being longer than the outermost element in the other slot, and the outer end faces of the outermost elements being disposed substantially the same radial distance from the axis of the saw plate.

3. A saw blade as recited in claim 1 in which the width of the gap is substantially less than the width of a recess so that the cutting elements overhang the recesses.

* * * * *